United States Patent
Zhan (10) Patent No.: US 10,147,440 B2
(45) Date of Patent: Dec. 4, 2018

(54) METHOD FOR PLAYING DATA AND APPARATUS AND SYSTEM THEREOF

(71) Applicant: MediaTek Singapore Pte. Ltd., Singapore (SG)

(72) Inventor: Peng Zhan, Guangdong (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/438,867

(22) Filed: Feb. 22, 2017

(65) Prior Publication Data
US 2017/0270947 A1 Sep. 21, 2017

(30) Foreign Application Priority Data
Mar. 17, 2016 (CN) .......................... 2016 1 0154771

(51) Int. Cl.
*G10L 21/043* (2013.01)
*H04W 4/80* (2018.01)

(52) U.S. Cl.
CPC ............. *G10L 21/043* (2013.01); *H04W 4/80* (2018.02)

(58) Field of Classification Search
CPC ........ G10L 21/043; H04R 3/00; H04W 4/008; H04W 4/12; G11B 27/10; H04N 21/4307; H04N 21/43615; H04N 21/4392; H04N 21/44004; H04N 21/4825; H04N 21/6373; H04N 21/6347; H04L 12/2838; H04L 12/282; H04L 2012/2841; H04L 2012/2849; H04L 65/1059; H04L 65/1093; H04L 69/28

USPC .......................................... 709/231, 205, 202
See application file for complete search history.

(56) References Cited

U.S. PATENT DOCUMENTS

| 4,772,966 A * | 9/1988 | Sharples ............ G11B 15/1808 360/13 |
| 5,623,690 A * | 4/1997 | Palmer ................ G06F 3/04847 348/E7.081 |
| 5,655,144 A * | 8/1997 | Milne ............... G06F 17/30017 375/E7.01 |
| 5,862,232 A * | 1/1999 | Shinbara .................. G10H 1/20 381/61 |
| 5,881,245 A * | 3/1999 | Thompson ............... H04N 7/52 375/E7.014 |

(Continued)

FOREIGN PATENT DOCUMENTS

| CN | 101771492 A | 7/2010 |
| CN | 105047209 A | 11/2015 |

(Continued)

*Primary Examiner* — Yogeshkumar Patel
(74) *Attorney, Agent, or Firm* — McClure, Qualey & Rodack, LLP (57) ABSTRACT

A method for data playing and an associated apparatus and system are provided. The method may be applied to a player apparatus. The player apparatus receives the data to be played from outside and stores the received data in a buffer. The method specifically includes the steps of: determining whether an amount of buffered data for the data to be played in the buffer is changed, wherein the buffered data input speed for the buffer is fixed; and when determining that the amount of buffered data is changed, adjusting a playing speed of the player apparatus, such that the buffered data output speed and the buffered data input speed are the same for the buffer.

14 Claims, 6 Drawing Sheets

(56) References Cited

U.S. PATENT DOCUMENTS

| | | | | |
|---|---|---|---|---|
| 6,134,379 | A * | 10/2000 | LaMacchia | G11B 27/034 386/201 |
| 6,332,163 | B1 * | 12/2001 | Bowman-Amuah | H04L 12/4604 709/217 |
| 6,526,325 | B1 * | 2/2003 | Sussman | G10H 1/0033 700/94 |
| 7,665,115 | B2 * | 2/2010 | Gallo | G06F 17/30905 709/205 |
| 8,391,681 | B2 * | 3/2013 | Matsumoto | G11B 20/10 386/326 |
| 2002/0040403 | A1 * | 4/2002 | Goldhor | G10L 21/04 709/231 |
| 2002/0052967 | A1 * | 5/2002 | Goldhor | G10L 21/04 709/231 |
| 2002/0101368 | A1 * | 8/2002 | Choi | G10L 21/04 341/61 |
| 2003/0165325 | A1 * | 9/2003 | Blair | G10L 21/04 386/344 |
| 2004/0010330 | A1 | 1/2004 | Chen | |
| 2004/0141731 | A1 * | 7/2004 | Ishioka | H04N 21/23406 386/220 |
| 2004/0187027 | A1 * | 9/2004 | Chan | G06F 21/10 705/51 |
| 2005/0273321 | A1 * | 12/2005 | Choi | G10L 21/04 704/207 |
| 2006/0002681 | A1 * | 1/2006 | Spilo | H04N 5/76 386/220 |
| 2006/0029365 | A1 | 2/2006 | Hamasaka | |
| 2006/0089980 | A1 * | 4/2006 | Nomura | H04N 21/43615 709/220 |
| 2006/0149850 | A1 * | 7/2006 | Bowman | G11B 27/10 709/231 |
| 2006/0209076 | A1 * | 9/2006 | Maeng | G10L 21/003 345/473 |
| 2007/0078662 | A1 * | 4/2007 | Sakurai | G10L 21/04 704/503 |
| 2007/0097256 | A1 * | 5/2007 | Maehara | H04N 21/23406 348/387.1 |
| 2007/0168188 | A1 * | 7/2007 | Choi | G10L 21/04 704/211 |
| 2008/0097633 | A1 * | 4/2008 | Jochelson | A63B 71/0686 700/94 |
| 2008/0228297 | A1 * | 9/2008 | Choi | G10L 21/04 700/94 |
| 2008/0304678 | A1 * | 12/2008 | Chen | G10L 21/04 381/71.12 |
| 2009/0016448 | A1 * | 1/2009 | Matsumoto | G11B 20/10 375/240.28 |
| 2009/0132242 | A1 * | 5/2009 | Wang | G10L 21/04 704/216 |
| 2009/0132243 | A1 * | 5/2009 | Suzuki | G10L 21/04 704/216 |
| 2009/0204842 | A1 * | 8/2009 | Tetik | G06F 1/12 713/400 |
| 2009/0257335 | A1 * | 10/2009 | Lin | G10L 21/04 369/83 |
| 2009/0290064 | A1 * | 11/2009 | Matsumoto | H04S 3/00 348/515 |
| 2010/0004937 | A1 * | 1/2010 | Schlosser | G10L 21/04 704/503 |
| 2010/0235486 | A1 * | 9/2010 | White | H04L 43/0858 709/223 |
| 2011/0040981 | A1 * | 2/2011 | Lindahl | H04H 20/40 713/189 |
| 2012/0113270 | A1 * | 5/2012 | Spracklen | H04N 17/004 348/194 |
| 2012/0143984 | A1 * | 6/2012 | Liu | H04L 65/1093 709/217 |
| 2012/0185072 | A1 * | 7/2012 | Millington | H04J 3/0664 700/94 |
| 2012/0323585 | A1 * | 12/2012 | Elias | G10L 21/04 704/504 |
| 2013/0104011 | A1 * | 4/2013 | Kim | G06F 11/10 714/807 |
| 2013/0268980 | A1 * | 10/2013 | Russell | H04N 21/4122 725/75 |
| 2015/0179227 | A1 * | 6/2015 | Russell | H04N 21/4122 386/201 |
| 2015/0332732 | A1 * | 11/2015 | Gilson | G11B 27/036 386/240 |
| 2015/0380054 | A1 * | 12/2015 | Vilermo | G11B 27/10 386/201 |
| 2016/0184726 | A1 * | 6/2016 | Andersson | A63H 30/04 710/8 |
| 2017/0004858 | A1 * | 1/2017 | Ngiam | G11B 27/005 |
| 2017/0034263 | A1 * | 2/2017 | Archambault | G06F 3/165 |
| 2017/0134499 | A1 * | 5/2017 | Moyer | H04L 67/12 |
| 2017/0200471 | A1 * | 7/2017 | Gilson | G11B 27/005 |
| 2018/0115844 | A1 * | 4/2018 | Lu | H04R 27/00 |

FOREIGN PATENT DOCUMENTS

| | | |
|---|---|---|
| CN | 105100876 A | 11/2015 |
| TW | 200739533 A | 10/2007 |
| TW | I339800 B | 4/2011 |

* cited by examiner

METHOD FOR PLAYING DATA AND APPARATUS AND SYSTEM THEREOF

CROSS REFERENCE TO RELATED APPLICATIONS

This application claims priority of China Patent Application No. 201610154771.5, filed on Mar. 17, 2016, the entirety of which is incorporated by reference herein.

BACKGROUND OF THE INVENTION

Field of the Invention

The invention generally relates to data processing technology, and more particularly, to methods, apparatuses and systems for playing data.

Description of the Related Art

Stable and fast data transmission can be achieved through WIFI, Bluetooth and other transmission technologies. Therefore, by means of these transmission technologies, the same data, such as audio, video, and so on, can be played on multiple devices at the same time. For example, among the home entertainment solutions currently available, a television (or smart set-top box) can be connected to several audios through WIFI technology. Additionally, audio equipment can be distributed in different rooms to form a multi-room audio system. In this scene, the television serves as a master device, while the audio equipment serves as a slave device. The television serving as the master device transmits audio data (such as music) of the television program being played to the connected audio equipment serving as the slave device in real time in order to facilitate the synchronized playing of the audio data of the television and audio equipment.

However, in practical applications, playing inconsistency between the master device and the slave device often occurs. For example, take the same song being played for instance, when the master device is playing at 28 s, the slave device may be playing at 27 s or 29 s. As a result, the user may repeatedly hear the same content within the interval of several seconds, leading to poor user experience. Additionally, inconsistency between the master device and the slave device may become more obvious as the playing continues. For example, when data with a long time length more than one hour) is being played, the continuous playing time exceeding one hour may result in several seconds of inconsistency between the master device and the slave device.

There are generally two methods to resolve this inconsistency. The first method is that the slave device periodically reconnect to the master device and discard previous data, wherein the user may hear discontinuous sounds every time data is discarded, resulting in worsened user experience. Another method is that the master device periodically sends synchronization signals, and the slave device carries out synchronized correction based on the synchronization signals received. However, this method involves synchronized mechanism design for both the master device and the slave device.

BRIEF SUMMARY OF THE INVENTION

Accordingly, embodiments of the invention provide methods, apparatuses and systems for playing data to effectively solve the synchronization problems for data playing.

An embodiment of the present invention provides a method for playing data applied to a player apparatus, wherein the player apparatus receives data to be played from an external device and stores the received data in a buffer, the method comprising: determining whether an amount of the stored data in the buffer of the player apparatus is changed, wherein an input speed for the data is fixed; and when determining that the amount of the stored data in the buffer is changed, adjusting a playing speed of the player apparatus for the data output speed for the buffer being the same as the input speed for the data to be played.

Another embodiment of the present invention provides a player apparatus, configured to receive data to be played from an external device and store the received data in a buffer, the player apparatus comprising: the buffer, configured to store the received data to be played, and the data to be played is input to the buffer with a fixed input speed; a playing circuit, configured to play the stored data to be played in the buffer; a determination module, configured to determine whether an amount of stored data in the buffer is changed during the playing circuit plays the stored data to be played; and an adjustment module, configured to adjust a playing speed of the playing circuit when the determination module determines that the amount of the stored data is changed for the data output speed for the buffer is the same as the fixed input speed for the data to be played.

Another embodiment of the present invention provides a data playing system, comprising a master device and a slave device, wherein the master device is configured to play data to be played and transmit the data to be played to the slave device, and wherein a playing speed for playing the data to be played and a speed for transmitting the data to be played to the slave device are fixed and the same for the master device, and the speed for transmitting the data to be played to the slave device data for the master device is equal to an input speed for inputting the data to be played; and the slave device comprising the aforementioned data player apparatuses.

In the aforementioned methods, apparatuses, or systems, for a data receiving end that receives data to be played, when determining that there are changes in the amount of cache data in the cache, the playing speed is adjusted such that the data input speed and the data output speed in the cache will be the same after adjusting the playing speed, while the data receiving end and the data transmitting end will achieve synchronized playing. This mechanism is mainly operated by the data receiving end, with low requirements for the data transmitting end, thereby simplifying the synchronized design mechanism.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In the following description, various specific details, such as specific system structures, interfaces, technologies or the like, are illustrated, for purposes of illustration and not of limitation, in order to provide a thorough understanding of the present invention. Nevertheless, it will be understood by those skilled in the art that the present invention may be practiced by other embodiments without these specific details. In other instances, detailed descriptions for well-known devices, circuits, and methods are omitted, so as not to interfere description of the invention with unnecessary details.

Figure 1:
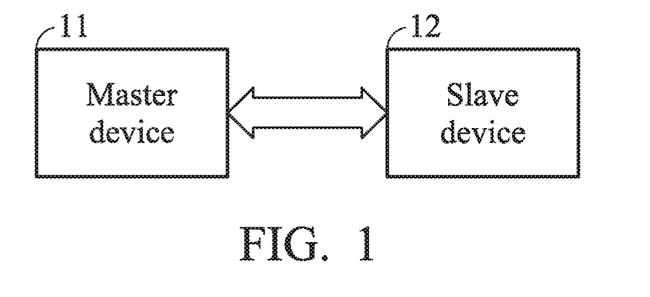
FIG. 1 is a schematic diagram illustrating a structure of a data playing system according to an embodiment of the invention.

In order to facilitate understanding of the present invention, a data playing system according to the present invention will be first described. Referring to FIG. 1, FIG. 1 is a schematic diagram illustrating a structure of a data playing system according to an embodiment of the invention. The data playing system comprises: a master device 11 and a slave device 12. Wherein, the master device 11 can be, for example, a television, a smart set-top box or the like, and the slave device 12 can be, for example, audio or the like, from which the slave device 12 has integrated a data playing function. The master device 11 and the slave device 12 can be connected via a wired or wireless (such as WIFE, Bluetooth, etc.), in order to achieve data transmission between the master device 11 and the slave device 12. In FIG. 1, the master device 11 can transmit playing data to the slave device 12, enabling the slave device 12 and the master device 11 to synchronously play data to be played. Specifically, the speed at which the master device 11 plays the data to be played is the same as the speed at which the master device transmits the data to be played to the slave device, which is the input speed of data to be played for the slave device. Additionally, detailed description of the slave device 12 can be referred to subsequent detailed description of FIGS. 7 to 9, and are omitted here for brevity. In particular, the data to be played can include but is not limited to: audio data, video data, or audio and video data. When the master device 11 and the slave device 12 are playing the data at the same time, the slave device 12 and the master device 11 must achieve synchronized playing. Take audio playing for instance, when the master device 11 is playing at 1 minute 28 seconds of the audio file, the slave device should also be playing at 1 minute 28 seconds of the audio file. To this end, the present invention provides the following technical solution to achieve synchronization between the master device 11 and the slave device 12 and the technical solution provided by the invention can properly achieve synchronization between the master device 11 and the slave device 12 to improve the user experience. Additionally, the synchronization mechanism is mainly performed in the slave device, thereby simplifying the design of the master device, for example, without the need for the master device to send synchronization signals.

Figure 2:
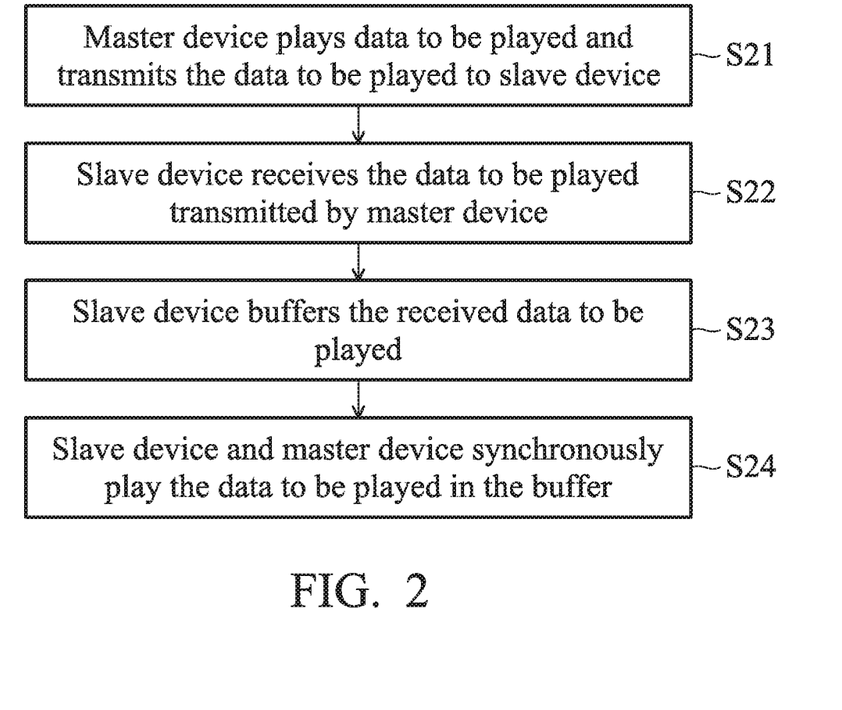
FIG. 2 is a flowchart illustrating a data playing process according to an embodiment of the invention.

Specifically, as shown in FIG. 2, which is a flowchart illustrating a data playing process according to an embodiment of the invention, which comprises following steps:

Step S21: The master device plays data to be played and transmits the data to be played to the slave device.

In this embodiment, the master device can transmit the data to be played to the slave device at a fixed data transmission speed. The data transmission speed can be the same as the master device's playing speed, for example.

Step S22: The slave device receives the data to be played transmitted by the master device in step S21.

Step S23: The slave device buffers the received data to be played.

Since the master's speed of data transmission to the slave device is fixed, from the slave device's perspective, the speed at which data is stored in the buffer (such as a cache) is fixed. That is, the speed at which data flows into the buffer is fixed.

Step S24: The slave device synchronously plays the data to be played that is buffered in step S23.

In this step, when extracting and playing data from the buffer, the slave device's data playing speed can be the same as the buffer's data output speed.

The above shows that when the playing of the master device and that of the slave device are synchronized, the data playing speed for both the master device and the slave device will be the same. At this time, the slave device's buffer data input speed and data output speed will be the same. Therefore, the amount of data in the buffer of the slave device remains unchanged. When the playing of the master device and that of the slave device are not synchronized, that is, the data playing speeds of the master device and the slave device are not the same, the slave device's buffer data input speed and data output speed will not be the same. Thus, the amount of stored data in the buffer is being changed. Accordingly, with the present invention, by detecting whether or not there are changes in the slave device's amount of stored data in the buffer, whether the playing of the master device and the playing of the slave device are synchronized can be determined; thus further carrying out adaptive adjustments.

Figure 3:
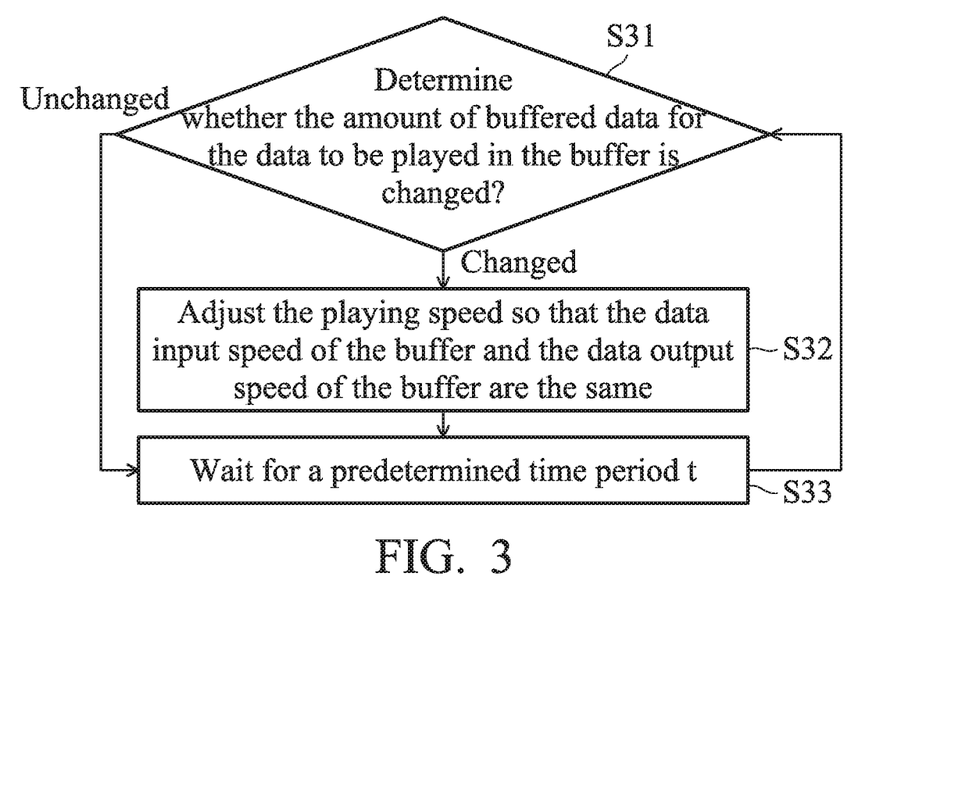
FIG. 3 is a flowchart of a method for data playing according to the first embodiment of the invention.

In the flow of FIG. 2, in order to achieve synchronous playing of the master device and the slave device, the flowchart of the method for data playing as shown in FIG. 3 can be utilized. Specifically, referring to FIG. 3, FIG. 3 is a flowchart of a method for data playing according to the first embodiment of the invention, which can be applied to the slave device applied to the data player integrated in the slave device). The slave device has a buffer for buffering data to be played. Wherein, for example, the buffer may be a ring buffer. The method comprises the following steps:

Step S31: Determine whether or not the amount of stored data for the data to be played in the buffer is changed. If a change in the amount of stored data in the buffer is detected, step S32 is performed; if no change is detected, step S33 is performed.

In particular, when the slave device extracts data to be played from the buffer and plays the data to be played, the slave device can select a fixed time (such as intervals of 10 s, 50 s, or 100 s; the intervals can be set by a timer) to detect the amount of stored (buffered) data in the buffer, so as to determine whether there are changes in the amount of buffered data based on the amount of data detected in adjacent two measurements. Wherein, when the amount of buffered data changes, it is determined that the playing of the master device and that of the slave device are unsynchronized; when there is no change in the amount of buffered data in the buffer, it is determined that the playing of the master device and that of the slave device are synchronized.

For example, assume that the amount of data detected in adjacent two measurements are a first amount of data and a second amount of data respectively, wherein the first amount of data is the amount of the data detected previously while the second amount of data is the amount of the data currently detected. Then, it can determine whether the first amount of data and the second amount of data are equal; if equal, it may consider that the amount of buffered data in the buffer is not changed; if not equal, it may consider that the amount of buffered data in the buffer is changed. Here, that the first amount of data and the second amount of data are equal means that a difference between the first amount of data and the second amount of data is within a threshold range, and that the first amount of data and the second amount of data are not equal means that the difference between the first amount of data and the second amount of data has exceeded the threshold range.

Step S32: adjust the playing speed so that the data input speed of the buffer and the data output speed of the buffer are the same.

In particular, when there are changes in the amount of buffered data in the cache, based on the increase or decrease in the amount of buffered data in the buffer, whether the playing speed of the slave device is faster or slower than that of the master device can be determined. For example, if the amount of buffered data increases, it means the slave device's playing speed is slower than the master device. In this case, the slave device's playing speed can be accelerated. If the amount of buffered data decreases, it means the slave device's playing speed is faster than the master device. In this case, the slave device's playing speed can be decelerated.

In this embodiment, the methods for adjusting the playing speed of the slave device may include, but is not limited to: adjust a system clock of the slave device or adjust an audio sampling rate of the slave device. These two adjustment methods will be described in detail below.

Step S33: After a predetermined time period t is passed, the flow returns to step S31 for execution.

In this embodiment, whether or not there are changes in the amount of buffered data in the slave device can be used as the basis for determining whether the master device and the slave device achieve synchronized playing. In addition, when there are changes in the amount of buffered data, the amount of buffered data can be stabilized by adjusting the slave device's playing speed, thereby achieving synchronization between the master device and the slave device.

The abovementioned adjustment of the system clock of the slave device or the audio sampling rate of the slave device is described in detail below.

Figure 4:
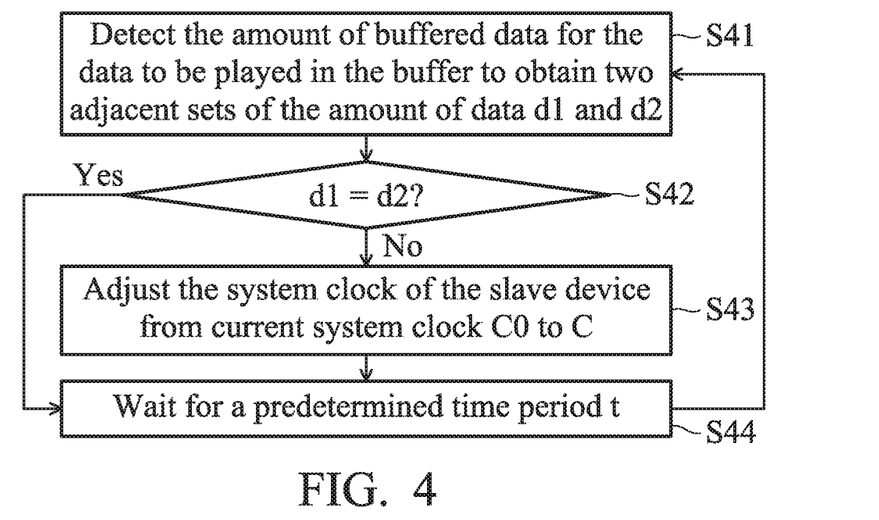
FIG. 4 is a flowchart of a method for data playing according to the second embodiment of the invention.

Refer to FIG. 4. The method for data playing may include the following steps:

Step S41: Detect the amount of buffered data in the buffer to obtain the two adjacent sets of the amount of data, namely, d1 and d2.

Step S42: Determine if d1 and d2 are equal in order to confirm whether the amount of buffered data is changed. When d1 and d2 are unequal, it is determined that the amount of buffered data is changed and step S43 is performed; when d1 and d2 are equal, it is determined that the amount of buffered data is unchanged and step S44 is performed.

Step S43: Adjust the system clock of the slave device from current system clock C0 to C and performs step S44.

Step S44: Wait for the next detection time (such as after a waiting time t has passed). When the next detection time arrives, performs step S41.

Wherein, in step S43, $$C = \left(1 + \frac{d2 - d1}{d0}\right) \times C0,$$

wherein d0 represents the amount of data played within the predetermined time period (such as t). The equation shows that when d2 exceeds d1, the amount of buffered data increases, indicating the playing of the slave device is slower than that of the master device. Therefore, after adopting the abovementioned adjustment method, the adjusted system clock C will be greater than the current system clock C0. That is, the system clock is adjusted forward, thereby increasing the playing speed of the slave device and reduces the amount of buffered data. On the contrary, when d2 is less than d1, the amount of buffered data decreases, which means that the playing of the slave device is faster than that of the master device. Hence, after adopting the abovementioned adjustment method, the adjusted system clock C will be less than the current system clock C0 thereby decreasing the playing speed of the slave device.

For example, assume that the data to be played is an audio file with a format of 48 khz 24 bit 2-channel (i.e., sampling rate is 48 khz, bit rate is 24 bit and channel mode is dual channel). Normal, data consumption per second is 288 KB (48 k*24*2/8). The slave device performs level sampling to the data to be played in the buffer every 100 seconds. If the amount of buffered data obtained from the current sampling is 100 KB less than the amount of buffered data obtained from the previous sampling, it means the playing speed of the slave device is 100 KB/(288 KB*100 s), approximately 0.003472222 (about 3.5/1000) faster than that of the master device. With this as the basis, the slave device's crystal frequency-division (abbreviated as APLL) is reduced by 3.5/1000. If the amount of buffered data detected in the current sampling is 100 KB greater than that of the previous sampling, it means the playing speed of the slave device is 100 KB/(288 KB*100 s), approximately 0.003472222 (about 3.5/1000) slower than Master. Therefore, the slave device increases the APIA, by 3.5/1000.

Figure 5:
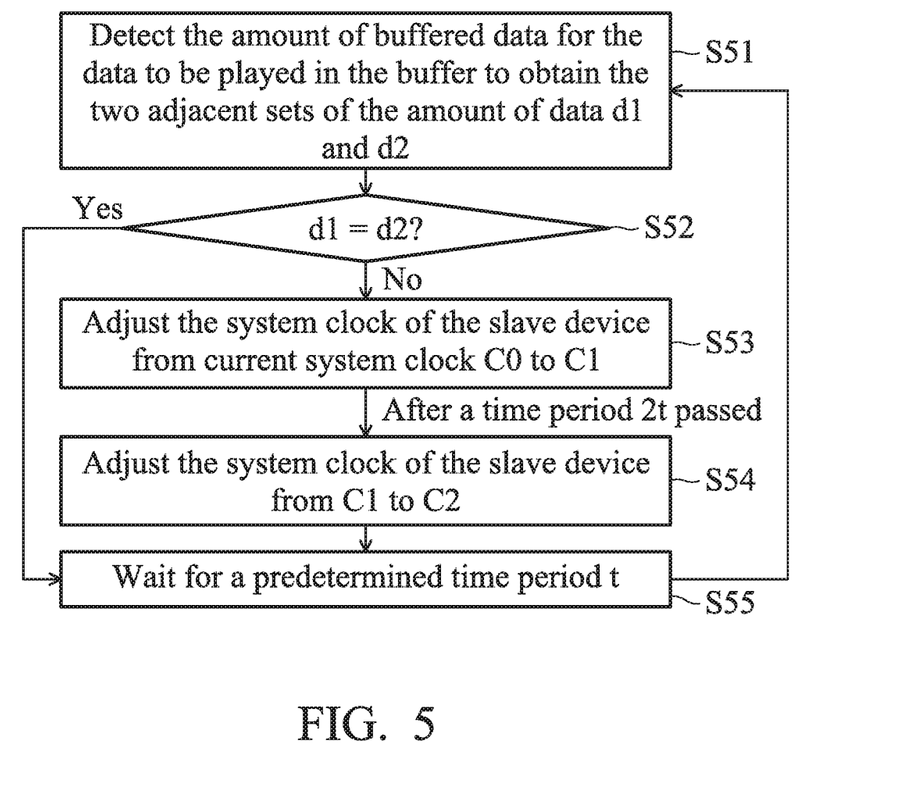
FIG. 5 is a flowchart of a method for data playing according to the third embodiment of the invention.

Please refer together with FIG. 5, the method for data playing may include the following steps:

Step S51: Detect the amount of buffered data for the data to be played in the buffer to obtain the two adjacent sets of the amount of data, namely, d1 and d2.

Step S52: Determine if d1 and d2 are equal in order to confirm whether the amount of buffered data is changed. When d1 and d2 are unequal, it is determined that the amount of buffered data is changed and step S53 is performed, when d1 and d2 are equal, it is determined that the amount of buffered data is unchanged and step S54 is performed.

Step S53: Adjust the system clock of the slave device from current system clock C0 to C1.

Step S54: After a time period 2t has passed, adjust the system clock of the slave device from current system clock C1 to C2 and then step S55 is performed.

Step S55: Wait for the next detection time (such as after a waiting time t has passed). When the next detection time arrives, step S51 is performed.

Wherein, in step S53, C1 is $$\left(1 + 2\frac{d2-d1}{d0}\right) \times C0.$$

In step S54, C2 is $$\left(1 + \frac{d2-d1}{d0}\right) \times C0,$$

wherein t represents the predetermined time period, d0 represents the amount of data played within the predetermined time period t.

Continuously taking the data to be played as shown in the above example as an example for illustration, if the amount of buffered data obtained from the current sampling is 100 KB less than the amount of buffered data obtained from the previous sampling, it means the playing speed of the slave device is 100 KB/(288 KB*100 s), approximately 0.003472222 (about 3.5/1000) faster than that of the master device. With this as the basis, the slave device reduces the APLL by 7/1000 (3.5*2/1000) and then increases the APLL by 3.5/1000 after 200 seconds are passed. If the amount of buffered data detected in the current sampling is 100 KB greater than that of the previous sampling, it means the playing speed of the slave device is 100 KB/(288 KB* 100 s), approximately 0.003472222 (about 3.5/1000) slower than the master device. Therefore, the slave device increases the APLL by 7/1000 (3.5*2/1000) and then decreases the APLL by 3.5/1000 after 200 seconds are passed.

The main difference between FIG. 4 and FIG. 5 is that after the slave device made adjustment based on the method specified in FIG. 4, the amount of buffered data was not adjusted to the previous amount of buffered data. For example, in the above embodiment, if the first amount of data obtained from previous sampling is 288 KB, the second amount of data obtained by the slave device from the sampling after 100 seconds is 388 KB. After the slave device made adjustment based on the method specified in FIG. 4, its subsequent amount of buffered data will be fixed in 388 KB and would not be reduced to the previous 288 KB. After the slave device made adjustment based on the method specified in the embodiment of FIG. 5, the amount of buffered data that the slave device obtains after 200 seconds later will be reduced to 288 KB. Meanwhile, the slave device may fix the amount of buffered data in 288 KB. Therefore, the advantage of the embodiment in FIG. 5 over the embodiment in FIG. 4 is that the amount of buffered data can be returned to the previously detected amount of data, thereby preventing fluctuations in the amount of buffered data and maintaining the stability of the amount of buffered data.

FIG. 4 and FIG. 5 describe the system clock adjustment method. How to adjust audio sampling rates will be described below with reference with FIG. 6.

Figure 6:
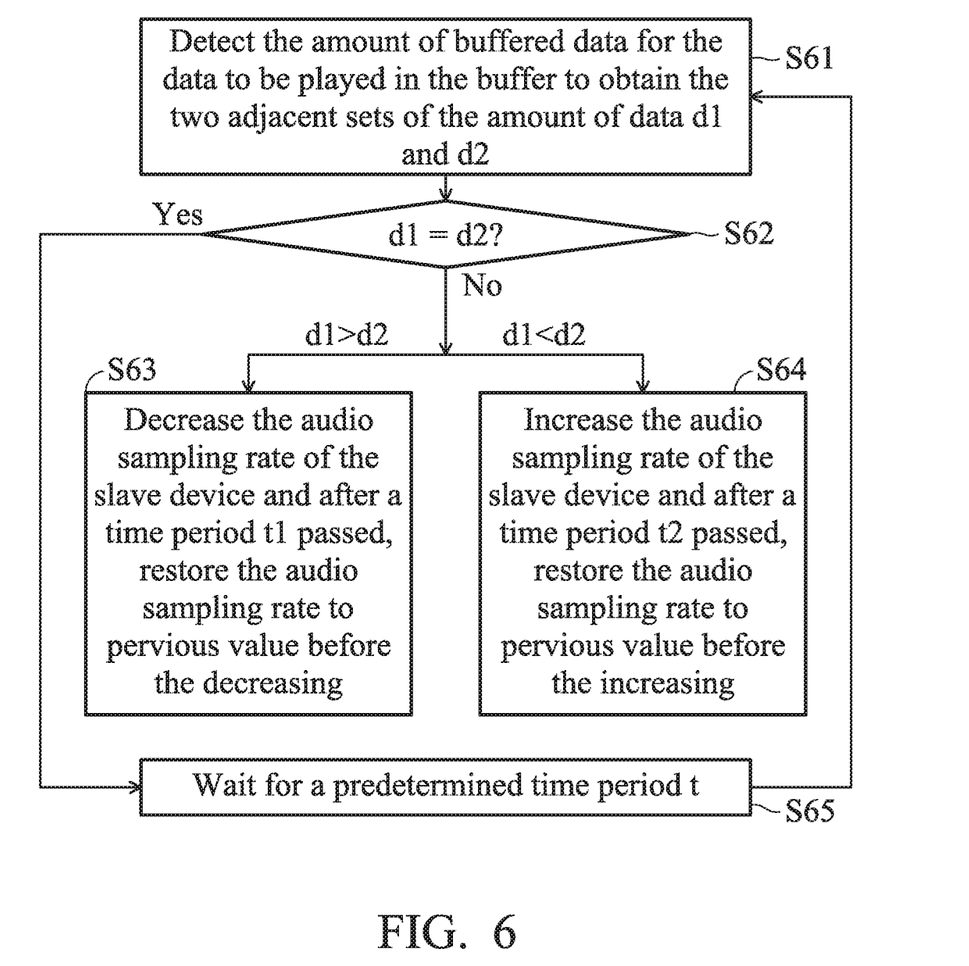
FIG. 6 is a flowchart of a method for data playing according to the fourth embodiment of the invention.

Please refer together with FIG. 6, the method for data playing as shown may include the following steps:

Step S61: Detect the amount of buffered data for the data to be played in the buffer to obtain the two adjacent sets of the amount of data, namely, d1 and d2.

Step S62: Determine if d1 and d2 are equal in order to confirm whether the amount of buffered data is changed. When d1 and d2 are unequal, it is determined that the amount of buffered data is changed and step S63 or step S64 is performed; when d1 and d2 are equal, it is determined that the amount of buffered data is unchanged and step S65 is performed. Step S65: Wait for the next detection time (such as after a waiting time t has passed). When the next detection time arrives, step S61 is performed.

Step S63: If d2<d1 (indicating that the amount of buffered data becomes smaller), the audio sampling rate of the slave device is decreased and after a time period t1 later, the audio sampling rate is restored to pervious value before the decreasing.

Specifically, if d2<d1, the audio sampling rate of the slave device will be increased from current audio sampling rate id to another audio sampling rate r2; and after a time period t1 has passed, the audio sampling rate of the slave device will be restored from r2 to r1, wherein $$t1 = \left(2t * \left|\frac{d2-d1}{d0}\right|\right) \Big/ \left(\frac{|r1-r2|}{r1}\right), r2 < r1.$$

Step S64: If d2>d1 (indicating that the amount of buffered data becomes larger), the audio sampling rate of the slave device is increased and after a time period t2 later, the audio sampling rate is restored to pervious value before the increasing.

Specifically, if d2>d1, the audio sampling rate of the slave device will be increased from current audio sampling rate r1 to another audio sampling rate r3; and after a time period t2 has passed, the audio sampling rate of the slave device will be restored from r3 to r1, wherein $$t2 = \left(2t * \left|\frac{d2-d1}{d0}\right|\right) \Big/ \left(\frac{|r1-r3|}{r1}\right), r1 < r3,$$

where t represents the predetermined time period and d0 represents the amount of data played by the salve device within the predetermined time period.

In this embodiment, the slave device has pre-stored several audio sampling rates and has preset the corresponding relationships between the variation amounts of buffer data and audio sampling rates. For example, if the amount of buffered data increase/decrease is within 100 KB, the audio sampling rate should be increased/decreased by one level. If the amount of cached data increase/decrease is within 100 KB-200 KB, the corresponding audio sampling rate should be increased/decreased by two levels.

Continue to apply the abovementioned data to be played as an example, the slave device's pre-stored sampling rate list from low to high contains: a first audio sampling rate (32 khz), a second audio sampling rate (44 khz), a third audio sampling rate (48 khz), and a fourth audio sampling rate (56 khz). If the amount of buffered data obtained from the current sampling is 100 KB less than the amount of buffered data obtained from the previous sampling, the slave device may determine the current sampling rate as 48 khz, which may further decrease the audio sampling rate to 44 khz. After it is maintained for $$\left(2 * 100 * \left|\frac{100}{288*100}\right|\right) \Big/ \left(\frac{48-44}{48}\right) = 8.57$$

seconds, the audio sampling rate will be returned to 48 khz. Therefore, during the next sampling, the amount of buffered data detected will show no change, thus the playing speed of the master device and that of the slave device are synchronized. If the amount of buffered data obtained from the current sampling is 100 KB greater than the amount of buffered data obtained from the previous sampling, the slave device may determine the current sampling rate as 48 khz, which may further increase the audio sampling rate to 56 khz. After it is maintained for $$\left(2*100*\left|\frac{100}{288*100}\right|\right)\bigg/\left(\frac{48-56}{48}\right)=4.17$$

seconds, the audio sampling rate will be returned to 48 khz. Therefore, during the next sampling, the amount of buffered data detected will show no change, thus the playing speed of the master device and that of the slave device are synchronized.

It should be understood that FIG. 4 and FIG. 5 specify long-term adjustment methods. That is, if the playing speed of the master device remains unchanged after adjustment, the playing speed of the master device and that of the slave device will be kept synchronized. However, the synchronized adjustment method in FIG. 6 is transitory. That is, the master device and the slave device may become unsynchronized starting from after adjustment to the next detection or after several detections, thus further adjustment is needed. Thus, adjustments at intervals are needed to maintain synchronized playing.

It should be noted that above embodiments of FIGS. 2 to 6 are mainly for illustrating the method for data playing using the master device and the slave device as an example, in particular, illustrated in the perspective of the slave device. However, the above-described method can also be simply applied to a player apparatus, wherein the player apparatus receives the data to be played from the outside and stores received data in a buffer, the method may comprise: determining whether an amount of buffered data for the data to be played in the buffer is changed, wherein the buffered data input speed is fixed; and when determining that the amount of the buffered data is changed, adjusting a playing speed of the player apparatus, such that the buffered data output speed and the buffered data input speed are the same. It should be understood that detailed descriptions and embodiments for determination of whether an amount of buffered data for the data to be played in the buffer is changed and adjustment of the playing speed of the player apparatus can still be referenced to embodiments shown in FIGS. 3-6. Similar to the method for data playing described herein, the present invention also provides a data player apparatus; wherein the player apparatus is configured to receive data to be played from the outside and store received data in a buffer. The data player apparatus comprises: a buffer configured to buffer the data to be played, and the data to be played is input to the buffer in a fixed input speed; a playing circuit configured to play the data that buffered in the cache; a determination module, configured to determine whether an amount of buffered data for the data to be played in the buffer is changed during which the playing circuit is playing the data to be played; and an adjustment module configured to adjust a playing speed of the playing circuit when the determination module determines that the amount of the buffered data is changed, such that the data output speed for the buffer is the same as the input speed for the data to be played.

Figure 7:
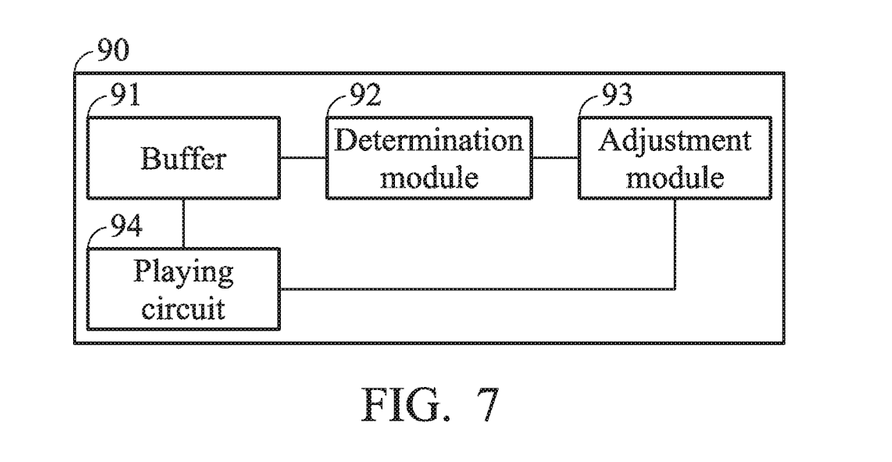
FIG. 7 is a schematic diagram illustrating a structure of a data player apparatus according to the first embodiment of the invention.
Figure 8:
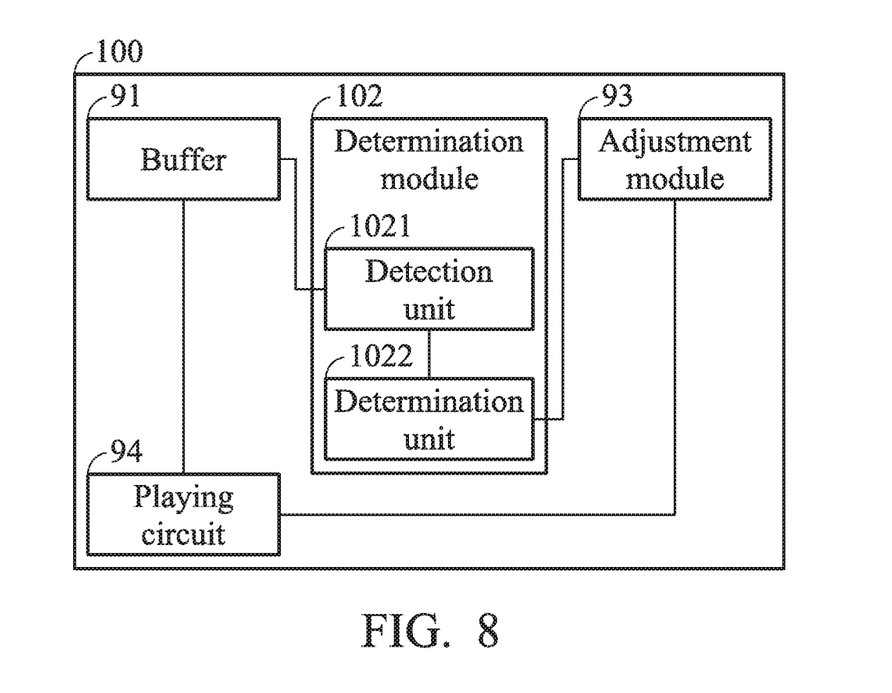
FIG. 8 is a schematic diagram illustrating a structure of a data player apparatus according to the second embodiment of the invention.
Figure 9:
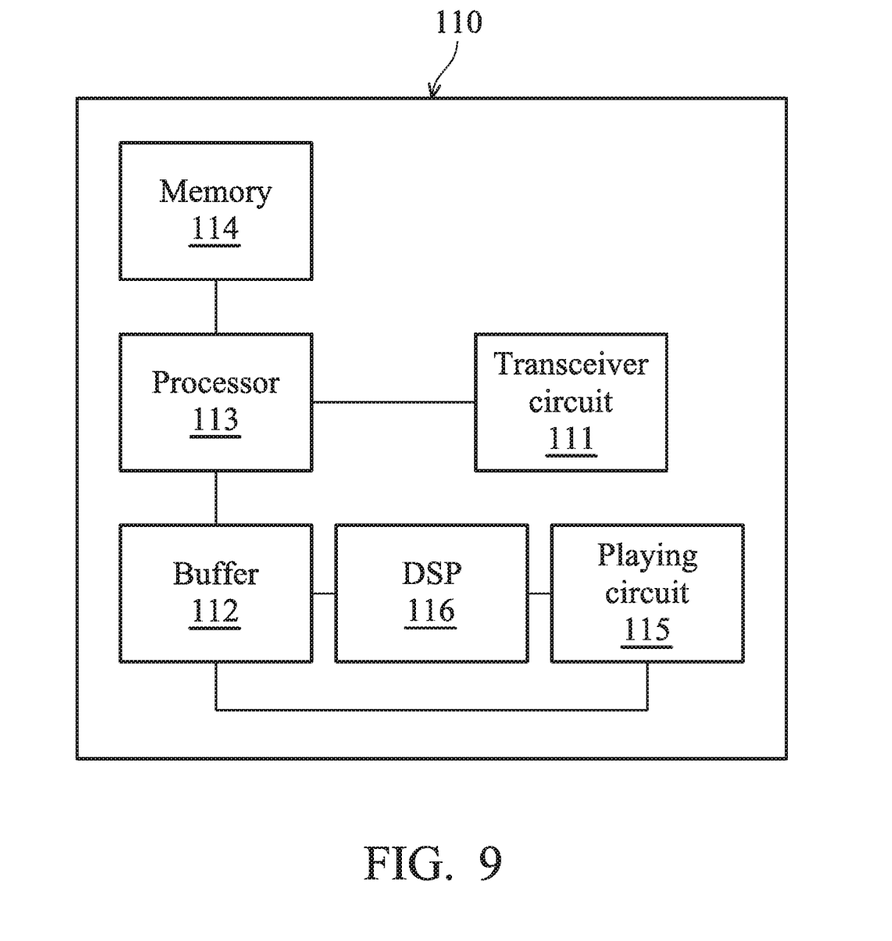
FIG. 9 is a schematic diagram illustrating a structure of a data player apparatus according to the third embodiment of the invention.

In order to more clearly illustrate the data player apparatus, for example, illustrating how it determines the amount of cache data is changed, how it adjusts the playing speed and so on, the data player apparatus shown in FIGS. 7 to 9 are further described. In description of FIGS. 7 to 9, for ease of understanding, the master device and the slave device are mainly used and described as examples and more particularly, described in view of the slave device; in the following paragraphs.

Refer to FIG. 7. FIG. 7 is a schematic diagram illustrating a structure of a data player apparatus according to the first embodiment of the invention. The data player apparatus 90 can be applied to the slave device as shown in FIG. 1, and is configured to receive data from the master device and play the received data. The data player apparatus 90 may include a buffer 91, a playing circuit 94, a determination module 92, and an adjustment module 93. Wherein the determination module 92 and adjustment module 93 can implement as a processor, such as the processor 113 in FIG. 9.

The buffer 91 is configured to buffer the data to be played from the mater device, and the data to be played is input to the buffer 91 in a fixed input speed.

The playing circuit 94 is configured to play the data to be played buffered in the buffer 91.

The determination module 92 is configured to determine whether an amount of data that buffered in the buffer 91 is changed during which the playing circuit 94 is playing the data to be played.

The adjustment module 93 is configured to adjust a playing speed of the playing circuit 94 when the determination module 92 determines that the amount of the buffered data is changed, such that the data output speed for the buffer 91 is the same as the input speed for the data to be played for the buffer 91.

Please referring together with FIG. 8, in another embodiment, the data player apparatus 100 includes all of the modules as shown in FIG. 7, except that the determination module 102 further comprises: a detection unit 1021, which is configured to sequentially detect the amount of buffered data in the buffer 91 in a predetermined time period to obtain a first amount of data and a second amount of data; and a determination unit 1022, which is configured to determine whether the first amount of data and the second amount of data are the same so as to determine whether the amount of cache data in the buffer 91 is changed.

Alternatively, the adjustment module 93 is specifically configured to: adjust a system clock of the slave device or adjust the audio sampling rate of the slave device.

Alternatively, the adjustment module 93 is further configured to: adjust a system clock of the data player apparatus from C0 to C to adjust the playing speed of the playing circuit; wherein C0 and C are provided with the following relation:

$$C=\left(1+\frac{d2-d1}{d0}\right)\times C0,$$

wherein d1 represents the first amount of data, d2 represents the second amount of data and d0 represents the amount of data played by the data player apparatus within the predetermined time period.

Alternatively, the adjustment module 93 is further configured to: adjust the system clock of the data player apparatus from C0 to:

$$\left(1+2\frac{d2-d1}{d0}\right)\times C0;$$

and after a time period 2t has passed, adjust the system clock of the data player apparatus to:

$$\left(1+\frac{d2-d1}{d0}\right)\times C0;$$

wherein t represents the predetermined time period, d1 represents the first amount of data, d2 represents the second amount of data and d0 represents the amount of data played by the data player apparatus within the predetermined time period.

Alternatively, the adjustment module 93 is further configured to: decrease an audio sampling rate of the playing circuit 94 from a first audio sampling rate r1 to a second audio sampling rate r2 when the second amount d2 of data is less than the first amount d1 of data; and after a time period t1 has passed, restore the audio sampling rate of the playing circuit 94 to the first audio sampling rate r1; wherein $$t1=\left(2t*\left|\frac{d2-d1}{d0}\right|\right)\Big/\left(\frac{|r1-r2|}{r1}\right), r2<r1,$$

where t represents the predetermined time period and d0 represents the amount of data played by the data player apparatus within the predetermined time period.

Alternatively, the adjustment module 93 is further configured to: increase an audio sampling rate of the playing circuit from the audio sampling rate r1 to another audio sampling rate r3 when the second amount d2 of data is greater than the first amount d1 of data; and after a time period t2 is passed, restore the audio sampling rate of the playing circuit to the first audio sampling rate r1; wherein $$t2=\left(2t*\left|\frac{d2-d1}{d0}\right|\right)\Big/\left(\frac{|r1-r3|}{r1}\right), r1<r3,$$

where t represents the predetermined time period and d0 represents the amount of data played by the data player apparatus within the predetermined time period. Alternatively, the value of the predetermined time period is selected from a range between 10 to 100 seconds.

Note that each module of the data player apparatus can be applied to carry out the respective steps of the method embodiments described above respectively and the specific process for implementation are the processes as described in the embodiments, thus detailed are omitted here for brevity.

Please referring to FIG. 9, FIG. 9 is a schematic diagram illustrating a structure of a data player apparatus according to the third embodiment of the invention. The data player apparatus 110 as shown in this embodiment can be integrated into the slave device as shown in FIG. 1. The data player apparatus 110 includes a transceiver circuit 111, a buffer 112, a processor 113, a memory 114 and a playing circuit 115.

The transceiver circuit 111 is used for data transmission with the master device. Particularly, the transceiver circuit 111 can be a wired or wireless transceiver circuit, in specific applications, can be a Bluetooth chip, WIFI chip, infrared remote sensing chips.

The buffer 112 is used to buffer data to be played from the master device, wherein the data to be played is input to the buffer 112 with a fixed rate. The buffer 112 can be part region of the memory 114, or the internal cache configured for the processor 113.

The memory 114 is used for storing computer programs and providing the computer programs to the processor 113. The memory 114 may include at least one of a read-only memory, a random access memory or a non-volatile random access memory (NVRAM).

In the embodiments of the invention, the processor 113, by invoking the computer programs stored in the memory 114, buffers the data to be played that is sent by the master device and received from the transceiver circuit 111 into the buffer 112 and outputs the data to be played in the buffer 112 to the playing circuit 115 to play the data. Alternatively, the data player apparatus 110 may further include a digital signal processor 116 (abbreviated: DSP), wherein when the processor 113 detects that the data to be played needs to be decoded, it outputs the data to be played in the buffer 112 to the DSP 116 and the data to be played is processed by the DSP 116 to perform signal processing and then output to the playing circuit 115 for playing.

Further, the processor 113 also executes the computer programs stored in the memory 114 to: during the data to be played is being played, determine whether the amount of cache data for the data to be played in the buffer 112 is changed to determine whether the playings between the master device and the data player apparatus are synchronized, wherein the data input speed for the buffer 112 is fixed; when determining that the amount of the buffered data is changed, adjusting the playing speed for data playing such that the data output speed for the buffer 112 is the same as the data input speed for the buffer 112.

Alternatively, the processor 113 performs the step for determining whether the amount of buffer data in the buffer 112 is changed, including: sequentially detect the amount of buffer data in the buffer 112 in a predetermined time period to obtain a first amount of data and a second amount of data; and determine whether the first amount of data and the second amount of data are the same so as to determine whether the amount of buffer data in the buffer 112 is changed.

Alternatively, the processor 113 performs the step of adjusting the playing speed for the data player apparatus including: adjust a system clock of the data player apparatus or adjust the audio sampling rate of the data player apparatus.

Alternatively, the step of adjusting the system clock of the data player apparatus performed by the processor 113 further comprises: adjusting the system clock of the player apparatus according to:

$$C=\left(1+\frac{d2-d1}{d0}\right)\times C0,$$

wherein d1 represents the first amount of data, d2 represents the second amount of data, d0 represents the amount of data played by the data player apparatus within the predetermined time period, C0 represents the system clock before adjusting and C represents the adjusted system clock.

Alternatively, the step of adjusting the system clock of the data player apparatus performed by the processor 113 further comprises: adjusting the system clock of the data player apparatus to:

$$\left(1 + 2\frac{d2 - d1}{d0}\right) \times C0;$$

after a time period 2t is passed, adjusting the system clock of the player apparatus to:

$$\left(1 + \frac{d2 - d1}{d0}\right) \times C0;$$

wherein t represents the predetermined time period, d1 represents the first amount of data, d2 represents the second amount of data, d0 represents the amount of data played by the player apparatus within the predetermined time period and C0 represents the system clock before adjusting.

Alternatively, the step of adjusting the audio sampling rate of the data player apparatus performed by the processor 113 further comprises: adjusting the audio sampling rate of the data player apparatus according to a size relationship between the first amount of data and the second amount of data.

Alternatively, the step of adjusting the audio sampling rate of the player apparatus according to the size relationship between the first amount of data and the second amount of data performed by the processor 113 further comprises: decreasing the audio sampling rate of the player apparatus from a first audio sampling rate r1 to a second audio sampling rate r2 when the second amount d2 of data is less than the first amount d1 of data; and after a time period t1 is passed, restoring the audio sampling rate of the data player apparatus to the first audio sampling rate r1; wherein $$t1 = \left(2t * \left|\frac{d2 - d1}{d0}\right|\right) / \left(\frac{|r1 - r2|}{r1}\right), r2 < r1,$$

where t represents the predetermined time period and d0 represents the amount of data played by the player apparatus within the predetermined time period.

Alternatively, the step of adjusting the audio sampling rate of the player apparatus according to the size relationship between the first amount of data and the second amount of data performed by the processor 113 further comprises: increasing the audio sampling rate of the player apparatus from a first audio sampling rate r1 to a second audio sampling rate r3 when the second amount d2 of data is greater than the first amount d1 of data; and after a time period t1 is passed, restoring the audio sampling rate of the player apparatus to the first audio sampling rate r1; wherein $$t2 = \left(2t * \left|\frac{d2 - d1}{d0}\right|\right) / \left(\frac{|r1 - r3|}{r1}\right), r1 < r3,$$

where t represents the predetermined time period and d0 represents the amount of data played by the player apparatus within the predetermined time period. Alternatively, the value of the predetermined time period is selected from a range from 10 to 100 seconds The methods disclosed in the above-described embodiments of the present invention can also be applied to the processor 113, or be implemented by the processor 113. The processor 113 can be an integrated circuit chip having a signal processing capability, e.g., an arm chip. In the implementation process, the steps of the method described above can be accomplished by hardware integrated logic circuits of the processor 113 or a form of software instructions.

In the several embodiments of the present invention provided, it should be understood that the systems, devices and methods disclosed can be implemented in other ways. For example, the device embodiments as described above are merely illustrative in nature, e.g., the division in unit or module, which is merely divided by logic function. In practice, there may be additional ways of division, such as a plurality of units or components may be combined or can be integrated into another system, or some features may be ignored, or not executed. Further, coupling or directly coupling between each other or communication connection therebetween as displayed or discussed may be achieved through indirectly coupling or communication connection among some interfaces, devices, or units, and can be in electrical, mechanical, or other forms.

The unit described as a separate component may be or may not be physically separated, and components displayed as the unit may or may not be a physical unit, which can be located in one place, or be distributed to multiple network units. Part or all of the units may be selected to achieve the object of the embodiment according to the actual needs.

Further, all of the functional units described in the embodiments of the present invention may be integrated in a processing unit, or each of which may be a separate physical unit, or two or more units may be integrated in single unit. The integrated unit as described above can be implemented in the form of hardware or in the form of software functional units.

If implemented in the form of software functional units and sold or used as a standalone product, the integrated unit can be stored in a computer readable storage media. Based on this understanding, the technical solution of the present invention is essentially or contribution part for the prior art or part of all of the technical solution may be embodied in the form of a software product, wherein the computer software product is stored in a storage media, which includes several instructions to instruct a computer device (which may be a personal computer, a server, or a network equipment) or processor to perform all or a portion of the steps of the aforementioned methods described in various embodiments of the present invention. The aforementioned storage media may include: USB disk, removable hard disk, Read-Only Memory (ROM), a Random Access Memory (RAM), floppy disk, CD-ROM or a variety of media capable of storing the program codes.

What is claimed is:

1. A method for playing data applied to a player apparatus, wherein the player apparatus receives data to be played from an external device and stores the received data in a buffer, the method comprising:
   determining whether an amount of the stored data in the buffer of the player apparatus is changed, wherein an input speed for the data is fixed; and
   when determining that the amount of the stored data in the buffer is changed, adjusting a playing speed of the player apparatus for the data output speed for the buffer being the same as the input speed for the data to be played;

wherein the step of adjusting the playing speed of the player apparatus comprises:

adjusting a system clock of the player apparatus according to:

$$C = \left(1 + \frac{d2 - d1}{d0}\right) \times C0,$$

wherein d1 represents a first amount of data in the buffer, d2 represents a second amount of data in the buffer, the first amount of data and the second amount of data are obtained by sequentially detecting the amount of the stored data in the buffer with a predetermined time interval, and d0 represents the amount of data played by the player apparatus within the predetermined time interval, C0 represents the system clock before adjusting and C represents the adjusted system clock.

2. The method according to claim 1, wherein the step of determining whether the amount of stored data in the buffer is changed comprises:

determining whether the amount of stored data in the buffer is changed according to a determination of whether the first amount of data and the second amount of data being the same.

3. The method according to claim 1, wherein the step of adjusting the system clock of the player apparatus further comprises:

adjusting the system clock of the player apparatus to:

$$\left(1 + 2\frac{d2 - d1}{d0}\right) \times C0;$$

wherein the step of the adjusting the system clock of the player apparatus according to:

$$C = \left(1 + \frac{d2 - d1}{d0}\right) \times C0$$

comprises: after a time duration 2t is passed, adjusting the system clock of the player apparatus to:

$$\left(1 + \frac{d2 - d1}{d0}\right) \times C0;$$

wherein t represents the predetermined time interval.

4. A method for playing data applied to a player apparatus, wherein the player apparatus receives data to be played from an external device and stores the received data in a buffer, the method comprising:

sequentially detecting the amount of the stored data in the buffer with a predetermined time interval to obtain a first amount of data and a second amount of data, wherein an input speed for the data is fixed;

determining whether the amount of stored data in the buffer is changed according to a determination of whether the first amount of data and the second amount of data being the same; and when determining that the amount of the stored data in the buffer is changed, adjusting a playing speed of the player apparatus for the data output speed for the buffer being the same as the input speed for the data to be played;

wherein the step of adjusting the playing speed of the player apparatus comprises:

decreasing an audio sampling rate of the player apparatus from a first audio sampling rate r1 to a second audio sampling rate r2 when the second amount d2 of data is less than the first amount d1 of data; and after a time duration t1 is passed, restoring the audio sampling rate of the player apparatus to the first audio sampling rate r1;

wherein $$t1 = \left(2t * \left|\frac{d2 - d1}{d0}\right|\right) / \left(\frac{|r1 - r2|}{r1}\right), r2 < r1,$$

where t represents the predetermined time interval and d0 represents the amount of data played by the player apparatus within the predetermined time interval.

5. The method according to claim 4, wherein the step of adjusting the playing speed of the player apparatus further comprises:

increasing the audio sampling rate of the player apparatus from a first audio sampling rate r1 to a third audio sampling rate r3 when the second amount d2 of data is greater than the first amount d1 of data; and after a time duration t2 is passed, restoring the audio sampling rate of the player apparatus to the first audio sampling rate r1;

wherein $$t2 = \left(2t * \left|\frac{d2 - d1}{d0}\right|\right) / \left(\frac{|r1 - r3|}{r1}\right), r1 < r3.$$

6. The method according to claim 2, wherein the predetermined time interval is selected from 10 to 100 seconds; and wherein the player apparatus receives the data to be played via Bluetooth, WIFI or infrared connection.

7. A data player apparatus, configured to receive data to be played from an external device and store the received data in a buffer, the player apparatus comprising:

the buffer, configured to store the received data to be played, and the data to be played is input to the buffer with a fixed input speed;

a playing circuit, configured to play the stored data to be played in the buffer;

a determination module, configured to determine whether an amount of stored data in the buffer is changed during the playing circuit plays the stored data to be played; and an adjustment module, configured to adjust a system clock of the data player apparatus according to an equation to adjust the playing speed of the playing circuit when the determination module determines that the amount of the stored data is changed for the data output speed for the buffer is the same as the fixed input speed for the data to be played;

wherein the equation is:

$$C = \left(1 + \frac{d2 - d1}{d0}\right) \times C0,$$

wherein d1 represents a first amount of data in the buffer, d2 represents a second amount of data in the buffer, the first amount of data and the second amount of data are obtained by sequentially detecting the amount of the stored data in the buffer with a predetermined time interval, and d0 represents an amount of data played by the player apparatus within the predetermined time interval, C0 represents the system clock before adjusting and C represents the adjusted system clock.

8. The data player apparatus according to claim 7, wherein the determination module further comprises:
a detection unit, configured to sequentially detect the amount of the stored data in the buffer with a predetermined time interval to obtain the first amount of data and the second amount of data; and
a determination unit, configured to determine whether the amount of the stored data in the buffer is changed according to a determination of whether the first amount of data and the second amount of data being the same.

9. The data player apparatus according to claim 7, wherein the adjustment module is further configured to:
adjust the system clock of the data player apparatus from C0 to:

$$\left(1 + 2\frac{d2 - d1}{d0}\right) * C0; \text{ and}$$

after a time duration 2t is passed, adjust the system clock of the player apparatus according to the equation $$C = \left(1 + \frac{d2 - d1}{d0}\right) * C0;$$

wherein t represents the predetermined time interval.

10. A data player apparatus, configured to receive data to be played from an external device and store the received data in a buffer, the player apparatus comprising:
the buffer, configured to store the received data to be played, and the data to be played is input to the buffer with a fixed input speed;
a playing circuit, configured to play the stored data to be played in the buffer;
a determination module, configured to determine whether an amount of stored data in the buffer is changed during the playing circuit plays the stored data to be played; and
an adjustment module, configured to decrease an audio sampling rate of the playing circuit from a first audio sampling rate r1 to a second audio sampling rate r2 when the second amount d2 of data is less than the first amount d1 of data; and
after a time duration t1 is passed, restore the audio sampling rate of the playing circuit to the first audio sampling rate r1;

wherein $$t1 = \left(2t * \left|\frac{d2 - d1}{d0}\right|\right) / \left(\frac{|r1 - r2|}{r1}\right), r2 < r1,$$

where
wherein d1 represents a first amount of data in the buffer, d2 represents a second amount of data in the buffer, the first amount of data and the second amount of data are obtained by sequentially detecting the amount of the stored data in the buffer with a predetermined time interval, t represents the predetermined time interval and d0 represents the amount of data played by the data player apparatus within the predetermined time interval.

11. The data player apparatus according to claim 10, wherein the adjustment module is further configured to:
increase an audio sampling rate of the playing circuit from a first audio sampling rate r1 to a third audio sampling rate r3 when the second amount d2 of data is greater than the first amount d1 of data; and
after a time duration t2 is passed, restoring the audio sampling rate of the playing circuit to the first audio sampling rate r1;

wherein $$t2 = \left(2t * \left|\frac{d2 - d1}{d0}\right|\right) / \left(\frac{|r1 - r3|}{r1}\right), r1 < r3,$$

where t represents the predetermined time interval.

12. The method according to claim 1, wherein the external device is configured to play data to be played and transmit the data to be played to the player apparatus, and wherein a speed for playing the data to be played for the external device and a speed for transmitting the data to the player apparatus are fixed and the same.

13. The method according to claim 4, wherein the step of determining whether the amount of stored data in the buffer is changed comprises:
determining whether the amount of stored data in the buffer is changed according to a determination of whether the first amount of data and the second amount of data being the same.

14. The data player apparatus according to claim 10, wherein the determination module further comprises:
a detection unit, configured to sequentially detect the amount of the stored data in the buffer with a predetermined time interval to obtain the first amount of data and the second amount of data; and
a determination unit, configured to determine whether the amount of the stored data in the buffer is changed according to a determination of whether the first amount of data and the second amount of data being the same.

* * * * *